Nov. 10, 1970  T. L. SCOTT  3,540,026

DELAY MECHANISM FOR MONITORING DEVICES

Filed Oct. 19, 1967

INVENTOR.
T. L. SCOTT

BY *Young & Quigg*

ATTORNEYS

United States Patent Office 3,540,026
Patented Nov. 10, 1970

3,540,026
DELAY MECHANISM FOR MONITORING DEVICES
Thomas L. Scott, Bartlesville, Okla., assignor to Phillips Petroleum Company, a corporation of Delaware
Filed Oct. 19, 1967, Ser. No. 676,412
Int. Cl. G08b 21/00
U.S. Cl. 340—239                                    4 Claims

ABSTRACT OF THE DISCLOSURE

A safety monitoring device is provided with a delay mechanism which counts the number of output signals from the monitoring device in a predetermined time interval. An alarm or shut-down system is activated only when the number of such output signals exceeds a preselected value, thereby preventing unnecessary alarms or shutdowns if only momentary disruptions occur.

---

This invention relates to delay mechanisms for use with safety monitoring devices.

Various types of safety devices are employed to monitor the operations of machines and processes. These safety devices measure a suitable operating variable and provide an alarm or shut-down signal whenever the variable exceeds certain limits. For example, it is common practice to employ monitors to measure the flow of lubricating oil to engines and compressors and to shut down the engines and compressors if the flow of lubricating oil is disrupted.

A problem has been encountered in the use of safety monitoring devices of this type because of the fact that a single output signal from the monitor results in the automatic shutting down of the engine and compressor. While this is the purpose of the monitor, it has been found that it is often not necessary to take this corrective action each time a single output signal is established by the monitor. For example, momentary surges of power in the electrical circuit or temporary low voltages have caused false output signals. In addition, it has been observed that temporary malfunctions of the monitors have occurred which have not been indicative of failure of the lubricating system itself. Since the shutting down of large compressors and engines can be an expensive operation and can cause serious operating problems in plants, a system is needed which prevents the monitors from shutting down the engines and compressors each time a "failure" signal is established.

A solution to this problem is provided in accordance with the present invention. A time delay mechanism is connected to the output of the monitor to count the number of "failure" signals which occur in a predetermined time interval. A final output alarm or shut-down signal is not generated unless the counted number of failures exceeds this predetermined value. The resulting delay can be accomplished by the use of a thermal time delay relay which is energized for a short time interval each time an output signal is generated by the monitor. However, this interval is not sufficiently long to cause the thermal time delay relay to be actuated. A series of such signals is required in a given time interval in order to generate a sufficient amount of heat to actuate the relay.

Accordingly, it is an object of this invention to provide improved apparatus for delaying the operation of safety monitoring devices.

Another object is to provide a method of counting the number of output signals from a safety monitoring device in a predetermined time interval and controlling the monitored process in response thereto.

Figure 1:
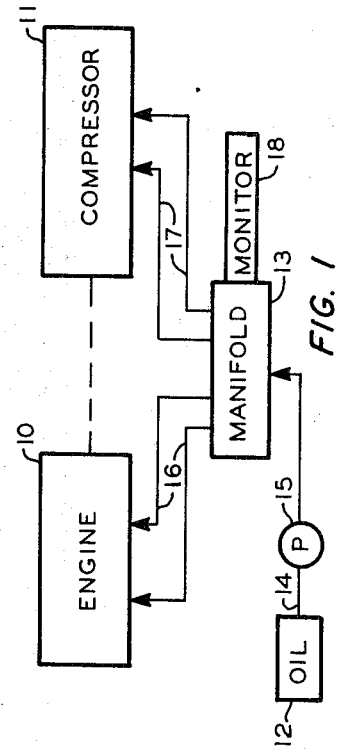
Figure 3:
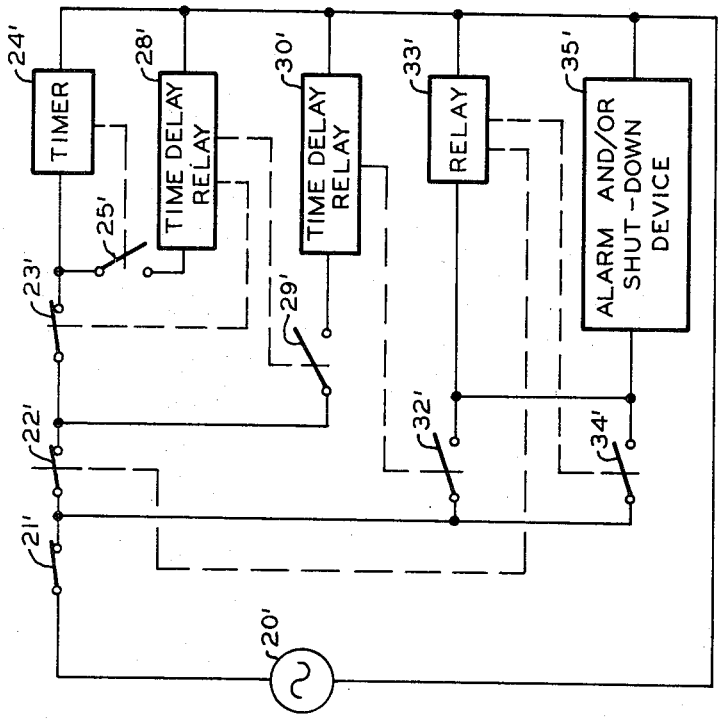
Figure 2:
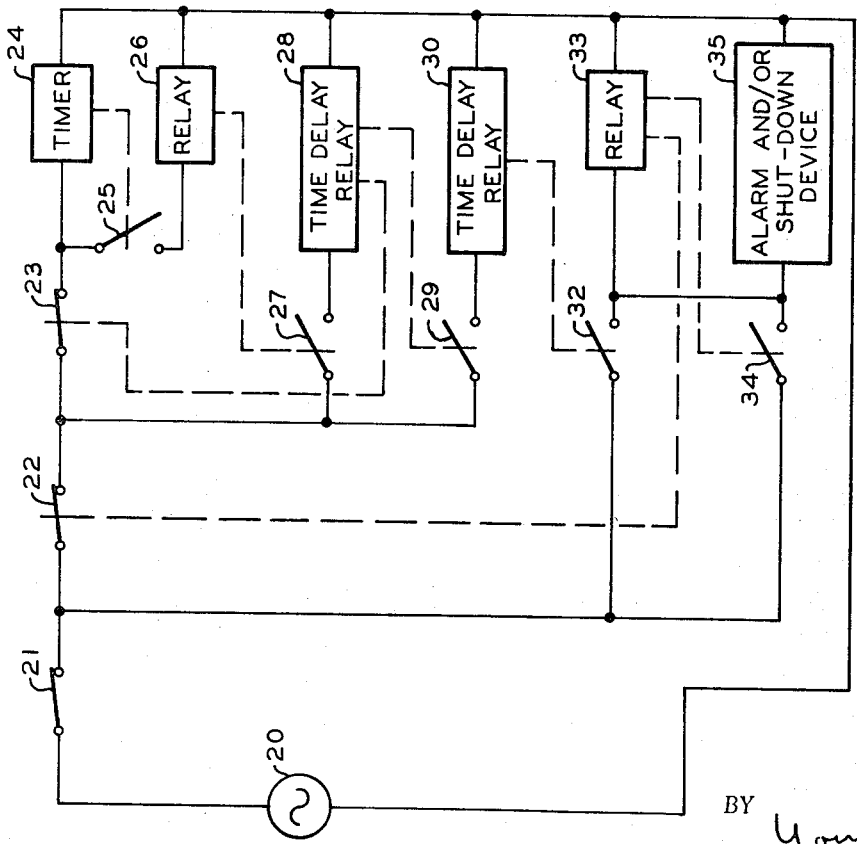

Other objects, advantages and features of the invention should become apparent from the following detailed description which is taken in conjunction with the accompanying drawing in which:

FIG. 1 is a schematic representation of a lubricating system for an engine and compressor, having a lubricating monitor associated therewith. FIG. 2 is a schematic circuit drawing of a first embodiment of the delay mechanism of this invention. FIG. 3 is a schematic circuit drawing of a second embodiment of the delay mechanism of this invention.

Referring now to the drawing in detail and to FIG. 1 in particular, there is shown an engine 10 which drives a compressor 11. Lubricating oil is supplied to the engine and compressor from a reservoir 12. This oil is passed from reservoir 12 to a manifold 13 by a conduit 14 which has a pump 15 therein. The oil is passed from manifold 13 to engine 10 through a plurality of conduits, such as 16, and to compressor 11 through a plurality of conduits, such as 17. In systems of this type, it is common practice to employ a lubricant flow monitor 18 to measure the flow of lubricating oil through manifold 13. A suitable monitor for use in this manner is described in Bulletin EC–103, entitled "Engine and Compressor Lubricating Systems," of Eaton Manufacturing Company, Cleveland, Ohio. The particular monitor described in the Eaton bulletin contains a reed switch which is actuated periodically when oil flows through the manifold. The monitor is provided with a timer which counts "down" in a time interval determined by the setting of the monitor. Actuation of the reed switch resets the timer to prevent it from counting down to zero as long as it is reset within the preselected time interval. Thus, no output signal is provided as long as a predetermined oil flow rate is measured.

However, as previously mentioned, momentary failures of the monitor and stray output signals due to voltage fluctuations of the power source are occasionally encountered. The present invention incorporates a delay mechanism into the monitor to prevent these signals from actuating an alarm and/or shutdown device.

A first embodiment of the delay mechanism of this invention is illustrated in FIG. 2. The first terminal of a current source 20 is connected by normally closed switches 21, 22 and 23 to the first terminal of a timer 24. The second terminal of timer 24 is connected to the second terminal of current source 20. Timer 24 forms a part of monitor 18 previously described, and operates to close a switch 25 whenever the timer counts to zero. The junction between switch 23 and timer 24 is connected by switch 25 to the first terminal of a relay 26, the second terminal of which is connected to current source 20. The junction between switches 22 and 23 is connected by a switch 27 to the first terminal of a time delay relay 28, the second terminal of which is connected to current source 20. A switch 29 and a time delay relay 30 are connected in parallel with switch 27 and time delay relay 28. The junction between switches 21 and 22 is connected by a switch 32 to the first terminal of a relay 33, the second terminal of which is connected to current source 20. A switch 34 is connected in parallel with switch 32. An indicating device such as an alarm and/or shut-down device 35 is connected in parallel with relay 33.

As long as monitor 18 detects oil flow in excess of a predetermined rate, the switches in the circuit of FIG. 2 remain in the positions illustrated because timer 24 does not close switch 25. Since switches 32 and 34 are open at this time, there is no current to device 35. If timer 24 counts to zero, switch 25 is closed. This energizes relay 26 to close switch 27. Closure of switch 27 results in time delay relay 28 being energized to open switch 23 and close switch 29. The delay of relay 28 occurs on the deenergization cycle rather than the energizing cycle, so that switches 23 and 29 are actuated immediately after relay 28 is energized. Closure of switch 29 results in current flowing through relay 30. Relay 30 is a thermal time delay relay which requires a predetermined amount of heat to be generated before the relay is actuated to close switch 32. One closure of switch 29 does not generate enough heat to actuate relay 30.

The opening of switch 23 by relay 28 serves to reset timer 24, which in turn opens switch 25. This de-energizes relay 26 to open switch 27. At the end of a predetermined time interval, relay 28 opens switch 29 and closes switch 23. The foregoing cycle then repeats if monitor 18 still senses a failure of flow of lubricant or if a "false" signal persists.

The components of the circuit of FIG. 2 are selected such that time delay relay 30 is actuated only if a series of flow failures are detected within a preselected time interval. Such a series of failures results in repetitive heating of the time delay relay to provide sufficient heat to close switch 32. When this occurs, relay 33 is energized to open switch 22 and close switch 34. The opening of switch 22 serves to de-activate the monitor and time delay mechanism thus far described. Closure of either switch 32 or 34 results in the passage of current through alarm and/or shut-down device 35, which can be employed to shut down engine 10. Switch 34 is provided in parallel with switch 32 so that relay 33 remains energized to keep switch 34 closed after switch 32 is opened due to the cooling of thermal time delay relay 30. The circuit of FIG. 2 can be reset by opening switch 21 to de-energize relay 33, thereby opening switch 34 and closing switch 22. In one specific embodiment of this invention, relay 28 has a delay period of approximately 20 seconds, and relay 30 has a delay period of approximately 60 seconds. Of course, other periods can be employed, depending on the amount of delay that can be tolerated before device 35 is actuated. It can thus be seen that relay 30 effectively "counts" the number of failures that occur in a given time interval. Of course, other types of counting devices can be employed in like manner.

A second embodiment of the control circuit of this invention is illustrated in FIG. 3. This circuit is similar in many respects to the circuit of FIG. 2 and corresponding elements are designated by like primed reference numerals. In the circuit of FIG. 3, time delay 28' is connected in circuit with switch 25'. Thus, closure of switch 25' by timer 24' results in the opening of switch 23' and the closing of switch 29'. This permits the elimination of relay 26 of FIG. 2. Otherwise, the circuit of FIG. 3 operates in substantially the same manner as does the circuit of FIG. 2.

While this invention has been described in conjunction with a flow monitor device for use in a lubricating system, it is by no means limited to such use. The delay mechanism of this invention can be employed to advantage with various types of monitoring and indicating equipment. This delay system is useful whenever it is desired to prevent an alarm or control mechanism from becoming actuated immediately following a single output signal from a monitoring device. Thus, while the invention has been described in connection with presently preferred embodiments, it should be evident that it is not limited thereto.

What is claimed is:
1. In a flow monitoring system which includes a flow monitor and an electrically actuated timer, said timer establishing an output signal at the end of a first period of time after being reset, said flow monitor being connected to said timer to reset said timer periodically when said flow monitor detects flow in a conduit being monitored, the intervals between the times that said timer is so reset being of shorter duration than said first period of time; the improvement comprising:
   first circuit means including a first switch connecting said timer to a current source;
   an indicating device, and second circuit means including a second switch connecting said indicating device to a current source;
   a first relay connected to said second switch to close same when said first relay is energized, and third circuit means including a third switch connecting said first relay to a current source to energize said first relay;
   a second relay connected to said third switch to close same when said second relay is actuated, and fourth circuit means including a fourth switch connecting said second relay to a current source to energize said second relay, said second relay being a thermal time delay relay which is actuated only when a predetermined temperature is reached, the temperature of said second relay being increased when the relay is connected to a current source;
   a third relay connected to said first and fourth switches to open said first switch and close said fourth switch when said third relay is actuated, and fifth circuit means including a fifth switch connecting said third relay to a current source to energize said third relay, said third relay being a delay relay which is actuated to open said first switch and close said fourth switch immediately when energized but which does not close said first switch and open said fourth switch until a predetermined period of time has elapsed after the relay is deenergized; and
   means responsive to said output signal to close said fifth switch.
2. The system of claim 1, further comprising a sixth switch included in said fourth and fifth circuit means so that said second and third relays can be energized only when said sixth switch is closed, and means connecting said first relay to said sixth switch so that said sixth switch is opened when said first relay is energized.
3. The system of claim 2 wherein said second and third circuit means are interconnected so that said second and third switches are connected in parallel so that closure of either said second switch or said third switch connects both said indicating device and said first relay to a current source.
4. The system of claim 1 wherein said means to close said fifth switch comprises a fourth relay connected to said fifth switch to close same when said fourth relay is energized, and means responsive to said output signal to energize said fourth relay.

References Cited

UNITED STATES PATENTS

| | | | |
|---|---|---|---|
| 1,337,680 | 4/1920 | Williams et al. | 307—141.4 |
| 2,274,384 | 2/1942 | Scanlan | 318—480 XR |
| 2,736,883 | 2/1956 | Boddy | 340—213 |
| 3,341,836 | 9/1967 | Marcum | 340—413 XR |

ALVIN H. WARING, Primary Examiner

D. MYER, Assistant Examiner

U.S. Cl. X.R.

317—141; 340—248, 270, 309.1